United States Patent
Armstrong et al.

(10) Patent No.: US 8,149,430 B2
(45) Date of Patent: Apr. 3, 2012

(54) DUAL-HEAD OR HYBRID PRINT DRIVER SUPPORTING XPS AND GDI PRINT PATHS WITHOUT PERFORMING DATA CONVERSION BETWEEN XPS TO EMF OR VICE VERSA

(75) Inventors: Charles Thomas Armstrong, Irvine, CA (US); Nobuo Ogura, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1000 days.

(21) Appl. No.: 12/117,179

(22) Filed: May 8, 2008

(65) Prior Publication Data

US 2009/0279122 A1    Nov. 12, 2009

(51) Int. Cl.
*G06F 3/12* (2006.01)
(52) U.S. Cl. ........ 358/1.13; 358/1.15; 358/1.1; 358/1.9; 358/448
(58) Field of Classification Search .................. None
See application file for complete search history.

(56) References Cited

U.S. PATENT DOCUMENTS

2005/0219596 A1 * 10/2005 Horiyama .................... 358/1.13
2007/0216939 A1 *  9/2007 Wada et al. .................. 358/1.15

OTHER PUBLICATIONS

Microsoft Windows, "The XPSDrv Filter Pipeline", Nov. 3, 2005, pp. 1-24.
Microsoft Windows, "XPS and Color Printing Enhancements in Microsoft® Windows Vista ™", Sep. 1, 2005, pp. 1-10.

* cited by examiner

*Primary Examiner* — Benny Tieu
*Assistant Examiner* — Paul F Payer
(74) *Attorney, Agent, or Firm* — Canon USA Inc IP Division

(57) ABSTRACT

A method is provided for improving printing performance of a print job from a Graphics Device Interface (GDI) based Windows® application submitted to an XPSDrv printer driver which is utilized by a filter pipeline service, wherein a required conversion from an existing GDI/device driver interface (DDI) to an XML Paper Specification (XPS) performed by a GDI-to-XPS conversion unit is eliminated to reduce latency. The method includes replacing the GDI-to-XPS conversion unit with a printer graphics driver which converts DDI calls into raw spool data; and adding a dual head filter as a first filter to the filter pipeline service to handle the raw spool data generated from the printer graphics driver.

28 Claims, 6 Drawing Sheets

DUAL-HEAD OR HYBRID PRINT DRIVER SUPPORTING XPS AND GDI PRINT PATHS WITHOUT PERFORMING DATA CONVERSION BETWEEN XPS TO EMF OR VICE VERSA

BACKGROUND OF THE INVENTION

1. Field of the Invention

The present invention relates to an improvement to the Microsoft® Windows® family of operating systems, and in particular, improvements to Microsoft® Windows Vista™ print driver technology.

2. Description of the Related Art

Recently, Microsoft Corporation has introduced the Microsoft® Windows Vista™ operating system. Windows Vista™ uses two print paths (or drivers) for processing print jobs including the XML Paper Specification (XPS) print path and the Graphics Device Interface (GDI) print path. The XPS print path implements a filter based XPSDrv print driver. Both print paths are present in the Windows Vista™ print subsystem which includes conversion routines that convert print jobs from one print path to the other. These drivers can be used to print from a Win32® application or Windows Presentation Foundation (WPF) application.

The XPSDrv print driver and print path processing are described in greater detail in the Microsoft® Windows® whitepaper entitled "The XPSDrv Filter Pipeline", published Nov. 3, 2005 (see http://www.microsoft.com/whdc/device/print/XPSDRV_FilterPipe.mspx). Moreover, an overview of printing enhancements enabled by XPS are described in greater detail in the Microsoft® Windows® whitepaper entitled "XPS and Color Printing Enhancements in Microsoft® Windows Vista™", published Sep. 1, 2005 (see http://www.microsoft.com/whdc/xps/vista_print.mspx).

Print Paths in Windows Vista™

FIG. 1 illustrates system components of the conventional print paths now provided in Windows Vista™. A print subsystem 6 is provided with an XPS to GDI conversion unit 8, a GDI to XPS conversion unit 10, an XPS spool 14, XPSDrv driver 18, EMF spool 12, and GDI/DDI driver 16. A Win32 application 2 starts a print job in the GDI print path 5. In the XPS print path 3, a Windows Presentation Foundation (WPF) application 4 starts the print job. Once an application submits a print job to the GDI/DDI driver 16, it may be processed and routed to a PDL-based device 20 for printing. Otherwise, when an application submits a print job to the XPSDrv driver 18, it may be routed to an XPS document-based 22 device for printing.

The print subsystem 6 in Windows Vista™ implements the XPS print path 3 that supports the XPS spool file 14 and the WPF based graphics engine. The GDI print path 2 (from Windows XP), which uses the GDI/DDI based print driver 16, is also still available in Windows Vista™. Moreover, FIG. 1 shows the additional built-in conversion capabilities that allow Microsoft Win32® GDI-based applications 2 to print to XPS document devices 22 and that allow WPF applications 4 to print to legacy printers 20. As a result, both Win32 and WPF applications 2, 4 can print to either type of printer driver 16, 18.

As shown in FIG. 1, if the Win32 application 4 prints to the XPSDrv driver 18, GDI-DDI calls are converted to XPS spool data before being sent to the XPSDrv Driver 18. On the other hand, if WPF application 4 prints to GDI/DDI driver 16, XPS based spool data is converted to EMF that will be fed to an EMF print processor to generate PDL output for a PDL-based device 20.

FIG. 2 illustrates a side-by-side comparison of the conventional XPS print path 3 and the conventional GDI print path 5 in Windows Vista and how the print subsystem 6 processes print jobs. Print jobs that are sent to a print queue with an XPSDrv printer driver 18 are spooled by print spooler 24 in the XPS spool file format 14 and processed in the XPS print path 3 by print filter pipeline service 28. Print jobs that are sent to the print queue with a GDI-based, Version-3 printer driver 16 are spooled by print spooler 24 in the EMF spool file format and processed in the GDI print path 5 by GDI print subsystem 27.

Now referring to FIG. 2, the print subsystem 6 further includes print spooler 24 which services the GDI print path 5 and the XPS print path 3, respectively. The architecture of the GDI/DDI driver 16 print path 5 includes GDI print subsystem 27 which includes printer graphics DLL Version 3 print driver 42, an EMF print processor 38 and a GDI rendering engine 40. The architecture of the XPSDrv driver 18 print path 3 includes a print filter pipeline service, filter configuration file 32 and a filter pipeline manager 30 which includes various filters for individualized tasks Filter A, Filter B, Filter n . . . and so on.

Conversion routines are performed by XPS to GDI conversion unit 8 and GDI to XPS conversion unit 10 so that Win32 applications 2 can print to an XPS printer 36 with XPSDrv printer driver 18 and WPF applications 4 can print to a GDI printer 34 with the GDI-based printer driver 16. When Win32 application 2 submits the print job to the spooler, the print subsystem determines whether the print job from the application 2 must be converted before spooling although the type of the printer driver 16, 18 of the target print queue determines which print path 3, 5 is supported. If the application's presentation technology differs from that of the print path 3, 5 supported by the driver 16, 18, the print job format must be converted by the XPS to GDI conversion unit 8 and GDI to XPS conversion unit 10 which convert between the XPS and the GDI print paths 3, 5.

XPS-to-GDI Conversion Path

FIG. 3 illustrates the conventional XPS-to-GDI conversion path 7 (see also FIG. 1). XPS documents that are sent to a printer 34 with a GDI-based printer driver 16 are converted by the XPS-to-GDI conversion (XGC) module 8 that is part of the WPF print support 11. In particular, FIG. 3 shows how the WPF print support 11 processes documents for printers 34, 36 based on the type of printer driver. The application 4 prints the document by using the WPF print support 11. Moreover, when printing to a GDI-based printer driver 16, the XGC 8 simulates a Win32-based application and makes GDI calls to the GDI functions that are required to spool the document for the GDI-based print path 5.

If the job is submitted from WPF application 4, underneath, WPF print support 11 checks the driver type, if it is an XPS-Drv driver 18, then the job is serialized to print pipeline service 28 and further processed by the XPSDrv filters 30.

GDI-to-XPS Conversion Path

FIG. 4 illustrates the GDI-to-XPS conversion path 9 (see FIG. 1). When a Win32 application 2 sends a document to a printer 36 with an XPSDrv printer driver 18, the spooler 24 uses the GDI-to-XPS conversion (GXC) unit 10 to create an XPS spool file 14 for the XPS print path 3 from the application that calls the GDI functions.

When the print job is submitted from a Win32 application 2, the type of the printer driver is checked. If it is an XPSDrv driver 18, GDI to XPS converter 10 (also referred to as MXDX) is used to convert GDI/DDI calls into XPS spool data 14 and then the print job is fed to print filter pipeline service 28.

Although the aforementioned conversions between XPS and EMF or vice versa are acceptable solutions, one drawback of this approach is that the conversions take processing time. In particular, these data conversions create unwanted latency with regard to the performance of the printing process. Since most of the printers out in the market do not support XPS natively, it is totally redundant to convert EMF into XPS, and again converting XPS into device-specific PDL data at the renderer filter.

Therefore, it would be advantageous to eliminate the conversion from XPS to GDI or from GDI to XPS in an effort to improve the performance of printing from the Win32 application 2 as well as provide rich XPS printing from a WPF application 4.

SUMMARY OF THE INVENTION

According to an exemplary embodiment of the present invention, an improvement is provided for the Microsoft® Windows® family of operating systems, such as the recently introduced Microsoft® Windows Vista™ operating system.

And in particular, a method of supporting XPS and GDI print job in a single driver without performing any data conversion between XPS to GDI or vice versa. This new hybrid dual-head XPS driver includes a GDI/DDI graphics driver as well as XPS filter components to support both print paths even though the driver utilized is configured as an XPS driver in an installation file. When the Win32 application prints to this dual-head XPS driver, a spooler tries to convert GDI/DDI calls into XPS, since the conversion unit is replaced with a GDI/DDI graphics driver, the print spooler ends up converting from GDI/DDI calls into either extended Enhanced MetaFile Format (EMF) data or RAW data in printer supported printer definition language (PDL). Replacing the GDI to XPS conversion unit with a graphics driver mimics the printing of the Win32 application using a GDI/DDI driver. As a result, the present invention will greatly improve performance of high-speed GDI printing from a Win32 application as well as provide feature-rich XPS printing from WPF based applications.

According to a first exemplary embodiment of the present invention, a method is provided for improving printing performance of a print job from a Graphics Device Interface (GDI) based Windows® application submitted to an XPSDrv printer driver which is utilized by a filter pipeline service, wherein a required conversion from an existing GDI/device driver interface (DDI) to an XML Paper Specification (XPS) performed by a GDI-to-XPS conversion unit is eliminated to reduce latency. The method includes replacing the GDI-to-XPS conversion unit with a printer graphics driver which converts DDI calls into raw spool data; and adding a dual head filter as a first filter to the filter pipeline service to handle the raw spool data generated from the printer graphics driver.

According to another aspect of the present invention, a first filter in the filter pipeline service is configured to take IPrintReadStream as input print data and then output print data as IPrintWriteStream, and determine whether the input print data is in an XPS data format or another data format generated from the printer graphics driver.

According to yet another aspect of the present invention, if the input print data is not in the XPS data format, and is instead in raw spool data format, the print job is resubmitted. Moreover, according to another aspect of the present invention, resubmitting the print job includes setting data type as XPS_PASS, and as a result, the filter pipeline service and input print data will be directly sent to a printer.

Furthermore, according another aspect of the present invention, when printing from a Windows Presentation Foundation (WPF) application, and if the first filter determines that the input print data is in XPS data format, the input print data is passed to a second filter of the filter pipeline service without any modification.

According to another embodiment of the present invention, a method for improving printing performance of a print job from a Graphics Device Interface (GDI) based Windows® application submitted to an XPSDrv printer driver which is utilized by a filter pipeline service, wherein a required conversion from an existing GDI/device driver interface (DDI) to an XML Paper Specification (XPS) performed by a GDI-to-XPS conversion unit is eliminated to reduce latency. Here, the method includes eliminating the conversion performed by the GDI-to-XPS conversion unit by replacing the GDI-to-XPS conversion unit with a printer graphics driver which converts DDI calls into enhanced metafile format(EMF) data; and adding a dual head filter as a first filter to the filter pipeline service to handle the EMF data generated from the printer graphics driver.

And furthermore, according to still yet another aspect of the present invention, a first filter in the filter pipeline service is configured to take IPrintReadStream as input print data and then output print data as IPrintWriteStream, and determine whether the input print data is in an XPS data format or EMF data format generated from the printer graphics driver.

Also, according to another aspect of the present invention, if the input print data is not in the XPS data format, and is instead in EMF data format Still further, according to another aspect of the present invention, instead of resubmitting the print job the first filter launches a page layout server and passes input print data through IPrintReadStream. Moreover, according to another aspect of the present invention, the page layout server reads the input print data, performs page layout features, and plays the EMF data.

And furthermore, according to another aspect of the present invention, the printer graphics driver generates raw print data which is sent to a printer. Also, according to another aspect of the present invention, instead of resubmitting the print job, the first filter launches a page layout server as a separate application and passes the input print data through a memory mapped file or a Namedpipe.

Moreover, according to another exemplary embodiment of the present invention, a computer readable medium is provided containing computer-executable instructions for improving printing performance of a print job from a Graphics Device Interface (GDI) based Windows® application submitted to an XPSDrv printer driver which is utilized by a filter pipeline service, wherein a required conversion from an existing GDI/device driver interface (DDI) to an XML Paper Specification (XPS) performed by a GDI-to-XPS conversion unit is eliminated to reduce latency. The medium includes computer-executable instructions for replacing the GDI-to-XPS conversion unit with a printer graphics driver which converts DDI calls into raw spool data; and computer-executable instructions for adding a dual head filter as a first filter to the filter pipeline service to handle the raw spool data generated from the printer graphics driver.

And finally, according to still yet another exemplary embodiment of the present invention, a computer readable medium is provided containing computer-executable instructions for improving printing performance of a print job from a Graphics Device Interface (GDI) based Windows® application submitted to an XPSDrv printer driver which is utilized by a filter pipeline service, wherein a required conversion from an existing GDI/device driver interface (DDI) to an XML Paper Specification (XPS) performed by a GDI-to-XPS conversion unit is eliminated to reduce latency. Here, the medium includes computer-executable instructions for eliminating the conversion performed by the GDI-to-XPS conversion unit by replacing the GDI-to-XPS conversion unit with a printer graphics driver which converts DDI calls into enhanced metafile format(EMF) data; and computer-executable instructions for adding a dual head filter as a first filter to the filter pipeline service to handle the EMF data generated from the printer graphics driver.

Besides improving printing performance, it is noted that another advantage of the present invention is that only one printer driver is required to print from Win32 applications as well as WPF applications without any data conversion.

It is also noted that further embodiments, features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate various embodiments, features and aspects of the present invention and, together with the description, serve to explain the principles of the invention.

DETAILED DESCRIPTION OF THE EMBODIMENTS

Exemplary embodiments, features and aspects of the present invention will now be herein described in detail below with reference to the drawings.
First Exemplary Embodiment
The aforementioned features and aspects of the first exemplary embodiment will now herein be discussed in greater detail below.
[Eliminating GDI to XPS Conversion by Replacing (MXDL) with Printer Graphics Driver and Resubmitting the Job]

Figure 1:
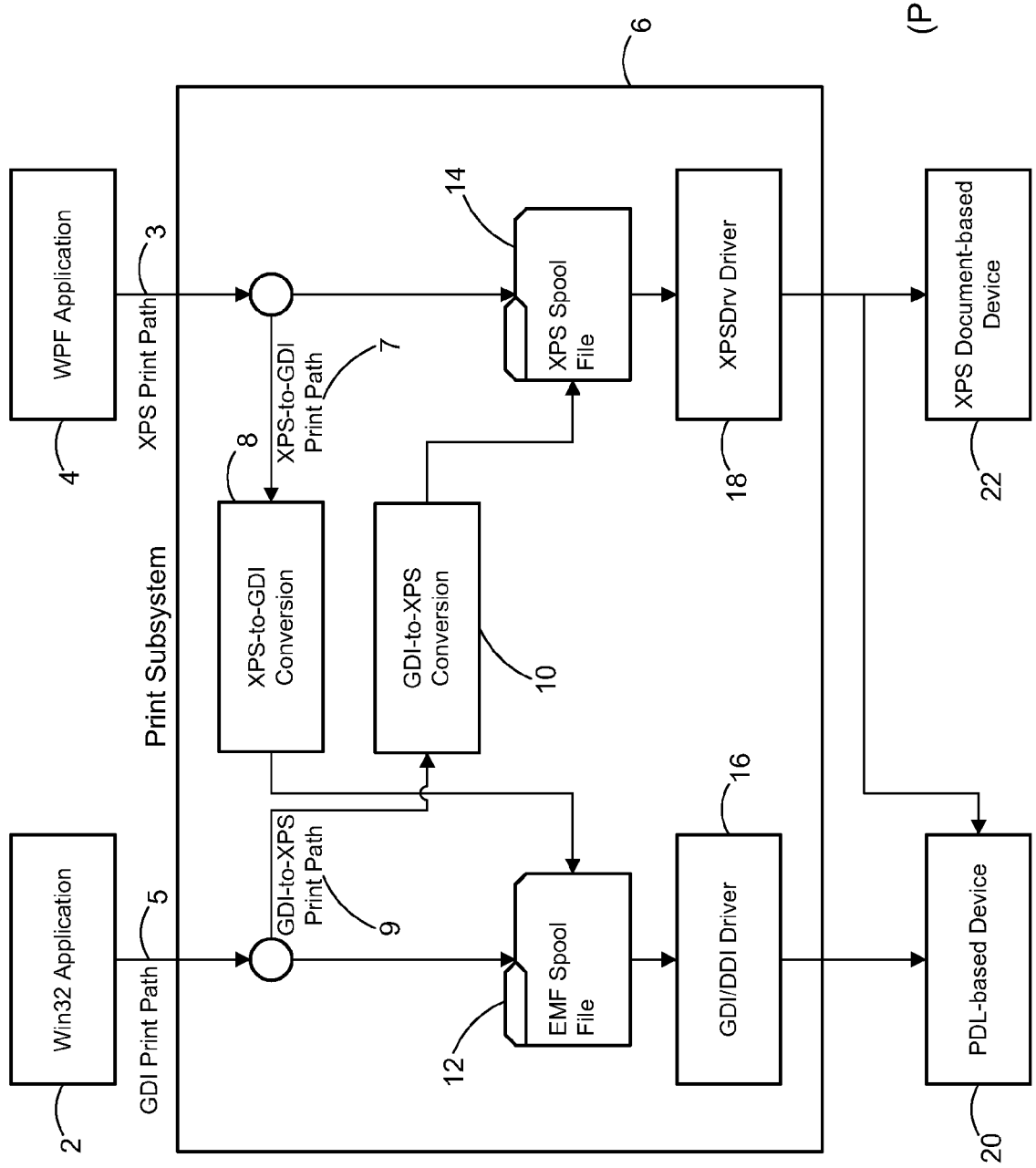
FIG. 1 illustrates system components of conventional print paths in Windows Vista.
Figure 2:
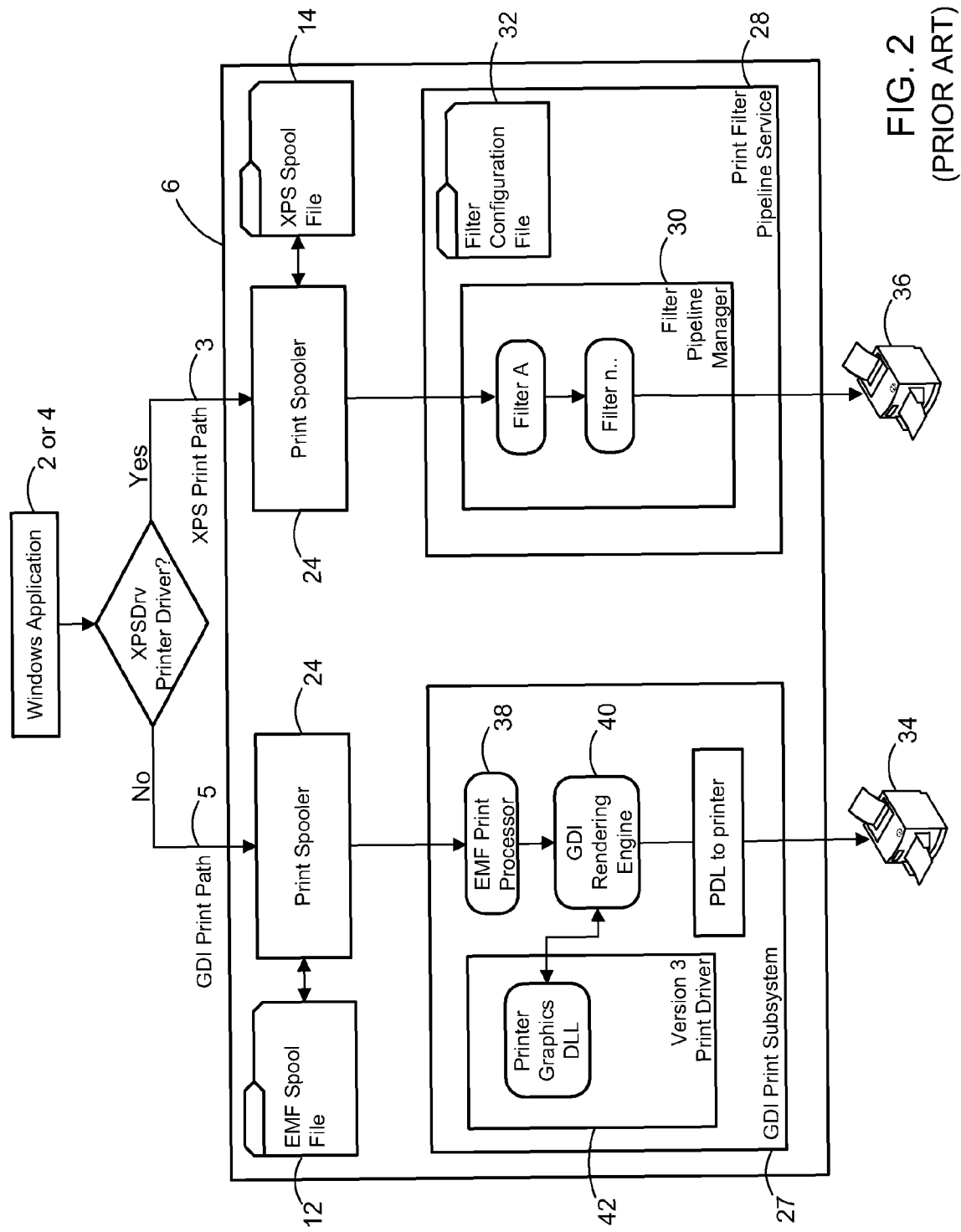
FIG. 2 illustrates a side-by-side comparison of a conventional XPS print path and a conventional GDI print path in Windows Vista.
Figure 3:
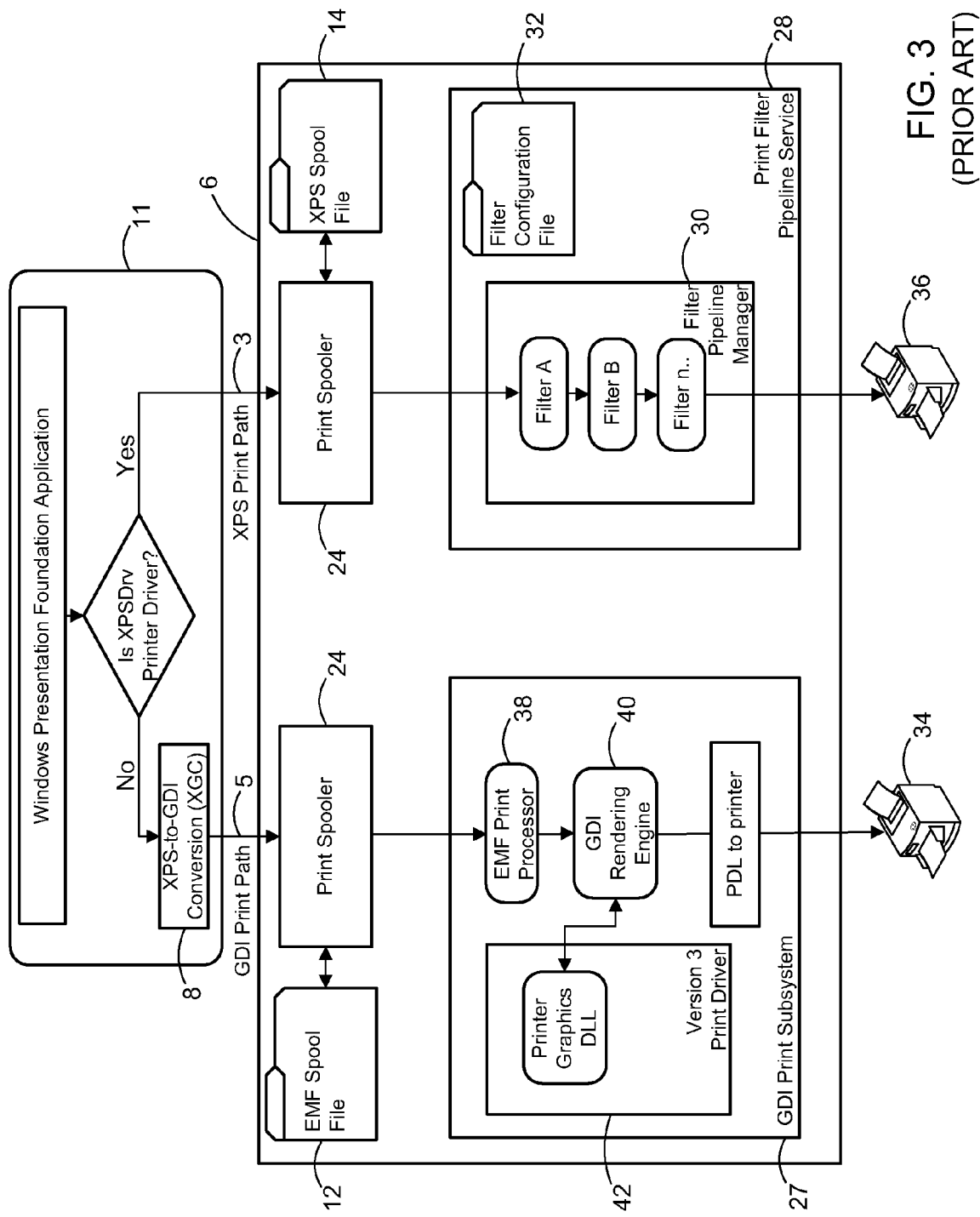
FIG. 3 illustrates the conventional XPS-to-GDI conversion path.
Figure 4:
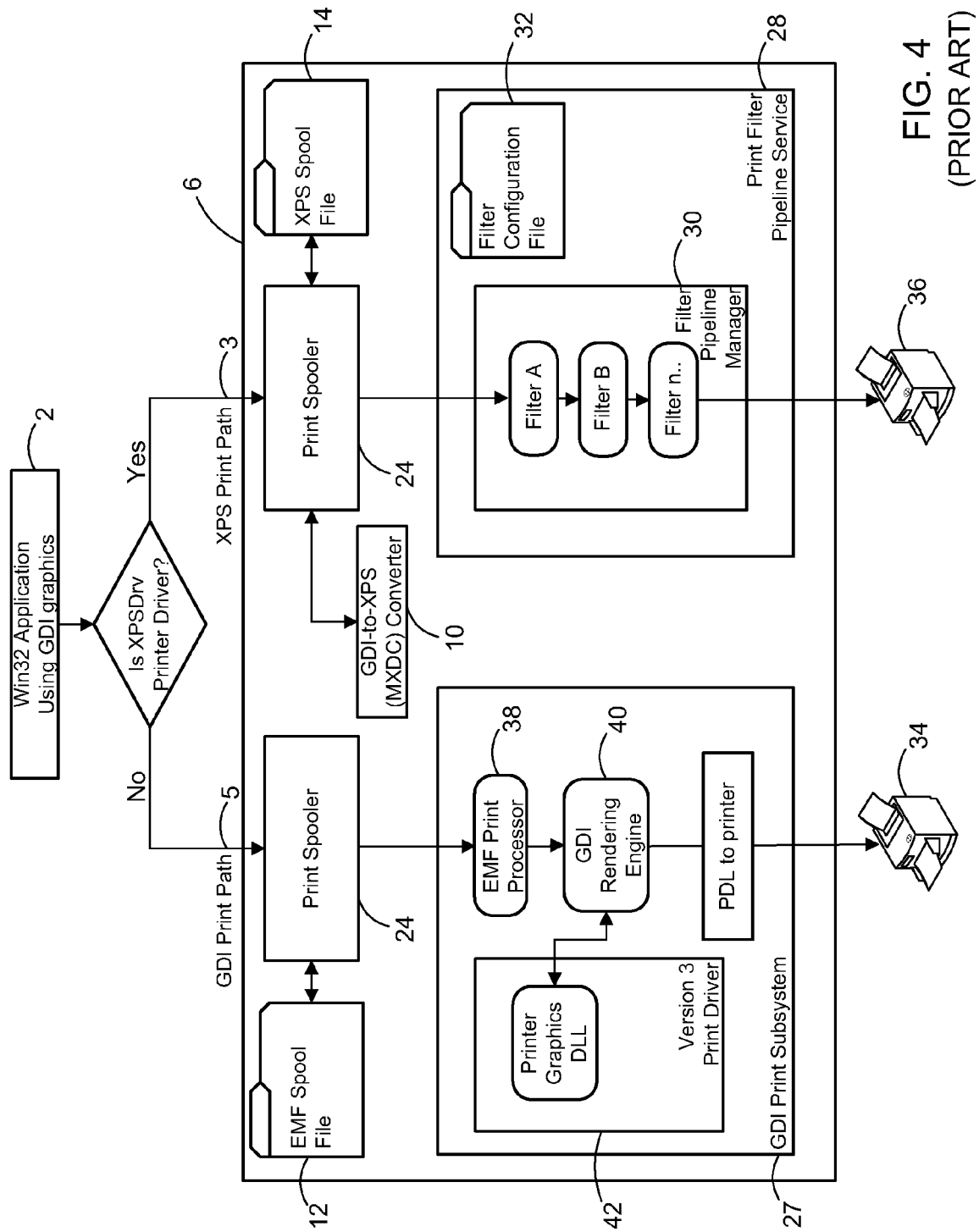
FIG. 4 illustrates the conventional GDI-to-XPS conversion path.
Figure 5:
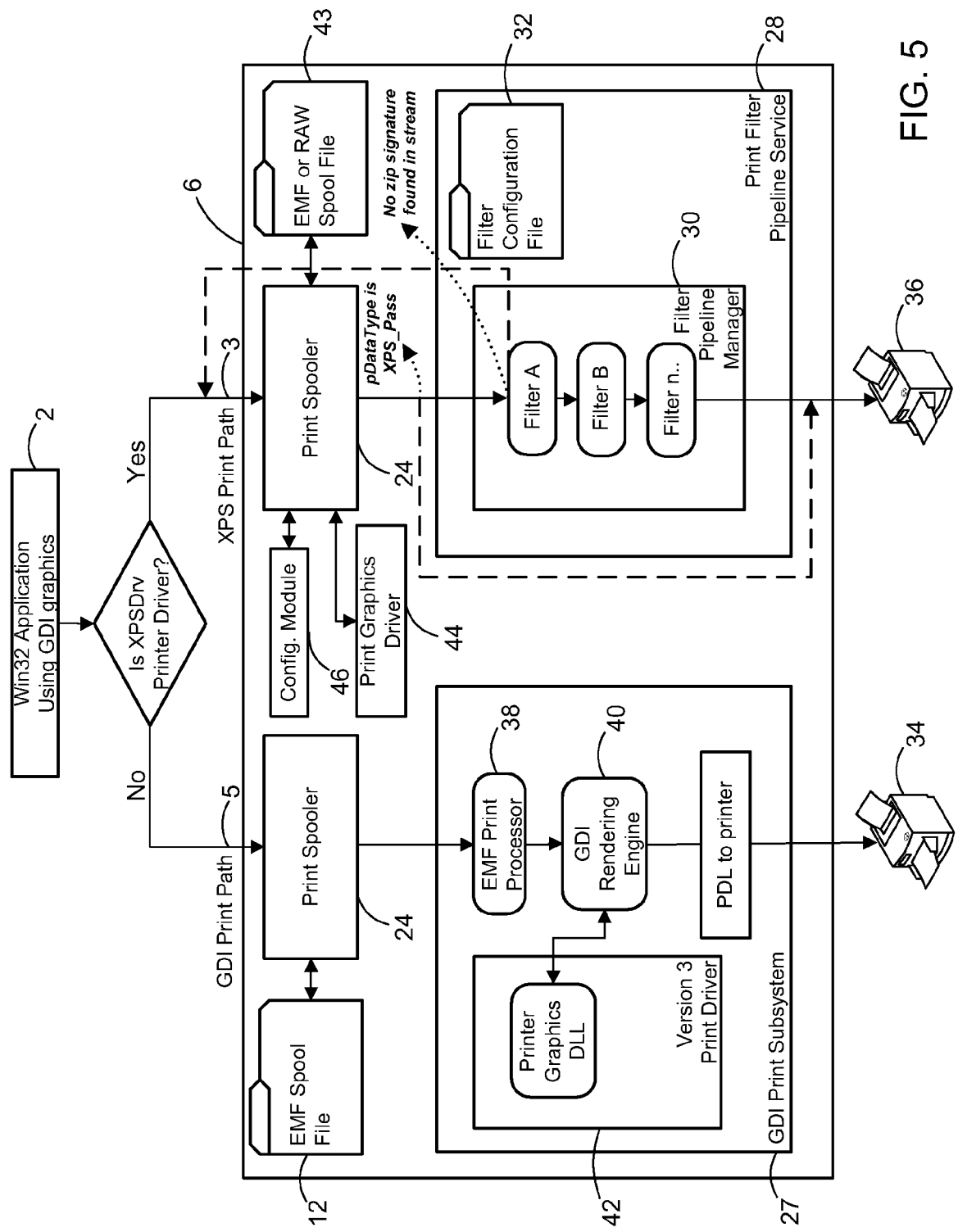
FIG. 5 illustrates a GDI-to-XPS conversion elimination procedure according to a first exemplary embodiment of the present invention.

FIG. 5 illustrates a GDI-to-XPS conversion elimination procedure according to a first exemplary embodiment of the present invention. Here, the GDI-to-XPS (which may also referred to as MXDC or MXDWDRV.DLL) converter 10 is replaced with printer graphics driver 44 in a printer installation setup file. Further, configuration module 46 is configured to handle DOCUMENT_EVENTS from GDI jobs as well as XPS print jobs.

In particular, the GDI-to-XPS (MXDL) conversion unit 10 is replaced with printer graphics driver 44 which rasterizes device driver interface (DDI) calls into RAW print data that will be sent to print filter pipeline service 28. The first Filter A in the filter pipeline service 28 is configured to take IPrintReadStream as input print data and output print data as IPrintWriteStream. Then first Filter A read the print data by using IPrintReadStream where it checks the incoming print data type to determine whether it is XPS data or another data format generated from the print graphics driver 44. If the input print data is not in an XPS data format and is instead in the device-specific RAW format, the job is resubmitted with setting data type as XPS_PASS as specified in the below pseudo code:

```
// Resubmit the new job.
DOC_INFO_1 docinfo;
docinfo.pOutputFile = NULL;
docinfo.pDataType = XPS_PASS;
StartDocPrinter(hPrinter, 1, &docinfo);
Call series of WritePrinter( ) with data reading from
IPrintReadStream.
EndDocPrinter( )
// Cancel the current job.
```

As a result, resubmitting the new job with pDataType as XPS_PASS will skip filter pipeline service 28 and print data will be directly sent to printer 36.

Further it is noted that when printing from WPF application 4, where if the first filter A determines the type of the print data as XPS print data is passed to the $2^{nd}$ filter B without any modification.
Second Exemplary Embodiment
The aforementioned features and aspects of the second exemplary embodiment will now herein be discussed in greater detail below.
[Eliminating GDI to XPS Conversion by Replacing (MXDL) Printer Graphics Driver and Launching In-Process Page Layout Server from First Filter]

Figure 6:
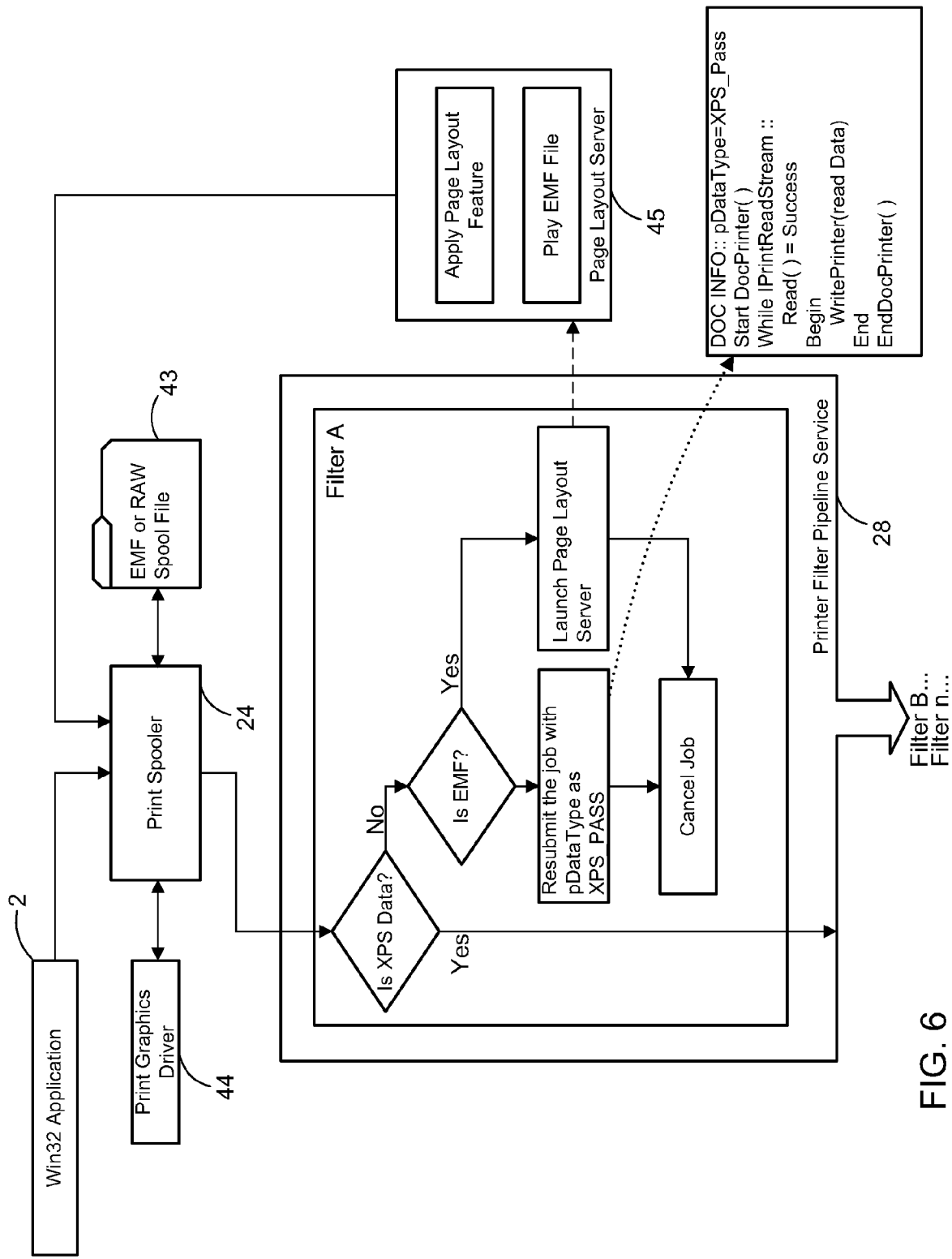
FIG. 6 illustrates another GDI-to-XPS conversion elimination procedure according to a second exemplary embodiment of the present invention.

FIG. 6 illustrates another GDI-to-XPS conversion elimination procedure according to a second exemplary embodiment of the present invention. In this approach, instead of resubmitting the print job from the first filter A within print filter pipeline service 28, first filter A launches page layout server 45 with passing IPrintReadStream as an input. The page layout server 45 can be an in-proc or a local server. When page layout server 45 is used, it reads the extended EMF spool file 43 data via IPrintReadStream, performs page layout features, and plays the EMF file. At this time, the GDI/DDI graphics driver 44 generates RAW print data which will be sent to printer 36. Communication between Filter A and page layout server 45 can be implemented in many different ways such as NamedPipe, memory mapped file, etc. or the like.
Third Exemplary Embodiment
The aforementioned features and aspects of the third exemplary embodiment will now herein be discussed in greater detail below.
[Eliminating GDI to XPS Conversion by Replacing (MXDL) with Printer Graphic Driver and Launching a Separate Application from First Filter A]

The third embodiment is similar to the second embodiment, but data is passed through a memory mapped file (not illustrated) or Namedpipe, instead of IPrintReadStream, from first filter A. In this embodiment, page layout features can be implemented in a separate application.
Other Exemplary Embodiments
While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

It is noted that this invention can also be applied to Windows XP SP2 upgraded to Windows XPS print driver technology.

The embodiments described above current describes using Microsoft's Ixps Document Provider and Ixps Document Consumer as input and output interfaces respectively. However, Microsoft also provides IPrintReadStream and IPrintWriteStream as input and output interfaces for the filters. Nevertheless, the present invention also applies for the usage IPrintReadStream and IPrintWriteStream without any change to the core flow described above.

The functions described above can be implemented by a host computer according to a program installed from outside. In that case, the present invention is applicable to a case where information including programs is supplied from a storage media, such as a CD-ROM, a flash memory, and an FD, or from an external storage medium through the network.

A storage medium storing program code of software that executes the functions of the above-described embodiments can be supplied to a system or an apparatus. Then, an aspect of the present invention can be achieved by reading and executing the program code stored on the storage medium by a computer (alternatively, a CPU or an MPU) of the system or apparatus.

In this case, the program code itself read from the storage medium can achieve the functions of the above-described embodiments, and the storage medium storing the program code configures the present invention. Accordingly, any form of program can be used as long as it has a program function, such as object code, a program executed by an interpreter, and script data supplied to an OS.

The storage medium for supplying a program includes, for instance, a flexible disk, a hard disk, an optical disk, a magnet-optical disk, an MO, a CD-ROM, a CD-R, a CD-W, a magnetic tape, a nonvolatile memory card, a ROM, a DVD or the like.

Moreover, the program according to the present invention can be encrypted and stored on a storage medium such as a CD-ROM to be distributed to users. Then, a user who meets a predetermined condition is allowed to download key information for decryption from a web page via the Internet. The user can install and execute the encrypted program using the key information.

Moreover, with program code read and executed by a computer, not only the functions of the embodiments are achieved but also an OS operating on the computer can perform all of or part of the actual processing based on the instruction of the program code. The functions of the embodiments are achieved by the processes described above.

In addition to that, program code read from a storage medium is written to a memory provided in a function extension board inserted in a computer or a function extension unit connected to a computer. Then, a CPU provided in the function extension board or the function extension unit performs all of or part of the actual processing based on the instruction of the program code. The functions of the embodiments are achieved by the above-described processes.

What is claimed:

1. A method for improving printing performance of a print job from a Graphics Device Interface (GDI) based Windows® application submitted to an XPSDrv printer driver which is utilized by a filter pipeline service, wherein a required conversion from an existing GDI/device driver interface (DDI) to an XML Paper Specification (XPS) performed by a GDI-to-XPS conversion unit is eliminated to reduce latency, the method comprising:
   replacing the GDI-to-XPS conversion unit with a printer graphics driver which converts DDI calls into raw spool data; and
   adding a dual head filter as a first filter to the filter pipeline service to handle the raw spool data generated from the printer graphics driver.

2. The method according to claim 1, wherein a first filter in the filter pipeline service is configured to take IPrintReadStream as input print data and then output print data as IPrintWriteStream, and determine whether the input print data is in an XPS data format or another data format generated from the printer graphics driver.

3. The method according to claim 2, wherein if the input print data is not in the XPS data format, and is instead in raw spool data format, the print job is resubmitted.

4. The method according to claim 3, wherein resubmitting the print job includes setting data type as XPS_PASS, and as a result, the filter pipeline service and input print data will be directly sent to a printer.

5. The method according to claim 2, wherein when printing from a Windows Presentation Foundation (WPF) application, and if the first filter determines that the input print data is in XPS data format, the input print data is passed to a second filter of the filter pipeline service without any modification.

6. A method for improving printing performance of a print job from a Graphics Device Interface (GDI) based Windows® application submitted to an XPSDrv printer driver which is utilized by a filter pipeline service, wherein a required conversion from an existing GDI/device driver interface (DDI) to an XML Paper Specification (XPS) performed by a GDI-to-XPS conversion unit is eliminated to reduce latency, the method comprising:
   eliminating the conversion performed by the GDI-to-XPS conversion unit by replacing the GDI-to-XPS conversion unit with a printer graphics driver which converts DDI calls into enhanced metafile format(EMF) data; and
   adding a dual head filter as a first filter to the filter pipeline service to handle the EMF data generated from the printer graphics driver.

7. The method according to claim 6, wherein a first filter in the filter pipeline service is configured to take IPrintReadStream as input print data and then output print data as IPrintWriteStream, and determine whether the input print data is in an XPS data format or another data format generated from the printer graphics driver.

8. The method according to claim 7, wherein if the input print data is not in the XPS data format, and is instead in raw spool data format, the print job is resubmitted.

9. The method according to claim 8, wherein resubmitting the print job includes setting data type as XPS_PASS, and as a result, the filter pipeline service and input print data will be directly sent to a printer.

10. The method according to claim 8, wherein instead of resubmitting the print job, the first filter launches a page layout server and passes input print data through IPrintReadStream.

11. The method according to claim 10, wherein the page layout server reads the input print data, performs page layout features, and plays the EMF data.

12. The method according to claim 11, wherein the printer graphics driver generates raw print data which is sent to a printer.

13. The method according to claim 8, wherein instead of resubmitting the print job, the first filter launches a page layout server as a separate application and passes the input print data through a memory mapped file or a Namedpipe.

14. The method according to claim 7, wherein when printing from a Windows Presentation Foundation (WPF) application, and if the first filter determines that the input print data is in XPS data format, the input print data is passed to a second filter of the filter pipeline service without any modification.

15. A non-transitory computer readable medium containing computer-executable instructions for improving printing performance of a print job from a Graphics Device Interface (GDI) based Windows® application submitted to an XPSDrv printer driver which is utilized by a filter pipeline service, wherein a required conversion from an existing GDI/device driver interface (DDI) to an XML Paper Specification (XPS) performed by a GDI-to-XPS conversion unit is eliminated to reduce latency, the medium comprising:
    computer-executable instructions for replacing the GDI-to-XPS conversion unit with a printer graphics driver which converts DDI calls into raw spool data; and
    computer-executable instructions for adding a dual head filter as a first filter to the filter pipeline service to handle the raw spool data generated from the printer graphics driver.

16. The medium according to claim 15, further including computer-executable instructions for configuring a first filter in the filter pipeline service to take IPrintReadStream as input print data and then output print data as IPrintWriteStream, and determine whether the input print data is in an XPS data format or another data format generated from the printer graphics driver.

17. The medium according to claim 16, further including computer-executable instructions for resubmitting the print job if the input print data is not in the XPS data format, and is instead in raw spool data format.

18. The medium according to claim 17, wherein computer-executable instructions for resubmitting the print job includes setting data type as XPS_PASS, and as a result, the filter pipeline service and input print data will be directly sent to a printer.

19. The medium according to claim 16, further including computer-executable instructions for passing the input data to a second filter of the filter pipeline service without any modification when printing from a Windows Presentation Foundation (WPF) application, if the first filter determines that the input print data is in XPS data format.

20. A non-transitory computer readable medium containing computer-executable instructions for improving printing performance of a print job from a Graphics Device Interface (GDI) based Windows® application submitted to an XPSDrv printer driver which is utilized by a filter pipeline service, wherein a required conversion from an existing GDI/device driver interface (DDI) to an XML Paper Specification (XPS) performed by a GDI-to-XPS conversion unit is eliminated to reduce latency, the medium comprising:
    computer-executable instructions for eliminating the conversion performed by the GDI-to-XPS conversion unit by replacing the GDI-to-XPS conversion unit with a printer graphics driver which converts DDI calls into enhanced metafile format(EMF) data; and
    computer-executable instructions for adding a dual head filter as a first filter to the filter pipeline service to handle the EMF data generated from the printer graphics driver.

21. The medium according to claim 20, further including computer-executable instructions for configuring a first filter in the filter pipeline service to take IPrintReadStream as input print data and then output print data as IPrintWriteStream, and determine whether the input print data is in an XPS data format or another data format generated from the printer graphics driver.

22. The medium according to claim 21, further including computer-executable instructions for resubmitting the print job if the input print data is not in the XPS data format, and is instead in raw spool data format.

23. The medium according to claim 22, wherein the computer-executable instructions for resubmitting the print job include setting data type as XPS_PASS, and as a result, the filter pipeline service and input print data will be directly sent to a printer.

24. The medium according to claim 22, further including computer-executable instructions for the first filter to launch a page layout server and pass input print data through IPrintReadStream, instead of resubmitting the print job.

25. The medium according to claim 24, further including computer-executable instructions for having the page layout server read the input print data, perform page layout features, and play the EMF data.

26. The medium according to claim 25, further including computer-executable instructions for the printer graphics driver to generate raw print data which is sent to a printer.

27. The method according to claim 22, further including computer-executable instructions for the first filter to launch a page layout server as a separate application and pass the input print data through a memory mapped file or a Namedpipe, instead of resubmitting the print job.

28. The medium according to claim 21, further including computer-executable instructions for passing the input print data to a second filter of the filter pipeline service without any modification when printing from a Windows Presentation Foundation (WPF) application, and if the first filter determines that the input print data is in XPS data format.

* * * * *